(12) United States Patent
Schmidt et al.

(10) Patent No.: US 9,231,285 B2
(45) Date of Patent: Jan. 5, 2016

(54) BATTERY DEVICE

(71) Applicant: Dr. Ing. h.c. F. Porsche Aktiengesellschaft, Stuttgart (DE)

(72) Inventors: Tim Schmidt, Ludwigsburg (DE); Dietmar Luz, Calw (DE); Nikolai Henger, Stuttgart (DE); Jeremy Curnow, Winchester (GB)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 211 days.

(21) Appl. No.: 14/030,001

(22) Filed: Sep. 18, 2013

(65) Prior Publication Data

US 2014/0079968 A1 Mar. 20, 2014

(30) Foreign Application Priority Data

Sep. 18, 2012 (DE) .......................... 10 2012 108 762

(51) Int. Cl.
| | |
|---|---|
| *H01M 10/613* | (2014.01) |
| *H01M 2/10* | (2006.01) |
| *B60L 11/18* | (2006.01) |
| *H01M 10/625* | (2014.01) |
| *H01M 10/647* | (2014.01) |
| *H01M 10/6556* | (2014.01) |

(52) U.S. Cl.
CPC ....... *H01M 10/5004* (2013.01); *B60L 11/1879* (2013.01); *H01M 2/1077* (2013.01); *H01M 2/1083* (2013.01); *H01M 10/613* (2015.04); *H01M 10/625* (2015.04); *H01M 10/647* (2015.04); *H01M 10/6556* (2015.04); *Y02T 10/705* (2013.01); *Y02T 10/7005* (2013.01); *Y10S 903/907* (2013.01)

(58) Field of Classification Search
CPC H01M 10/613; H01M 2/1077; H01M 10/625
See application file for complete search history.

(56) References Cited

U.S. PATENT DOCUMENTS

| | | | |
|---|---|---|---|
| 6,821,671 B2 | 11/2004 | Hinton et al. | |
| 2008/0251246 A1* | 10/2008 | Ohkuma et al. | ............. 165/287 |

(Continued)

FOREIGN PATENT DOCUMENTS

| | | |
|---|---|---|
| CN | 1826705 | 8/2006 |
| DE | 10 2008 034 863 | 1/2010 |

(Continued)

OTHER PUBLICATIONS

German Search Report of Jun. 21, 2013.

(Continued)

*Primary Examiner* — Stewart Fraser
*Assistant Examiner* — Olatunji Godo
(74) *Attorney, Agent, or Firm* — Gerald E. Hespos; Michael J. Porco; Matthew T. Hespos

(57) ABSTRACT

A battery device has at least two interconnected battery modules and at least one cooling plate arranged between two battery modules for cooling the battery modules. A housing encases the battery device and is provided with a frame structure. The at least one cooling plate is traversed by a flow of fluid and is formed from two metal layers that are connected to one another. Additionally, the at least one cooling plate is connected fixedly at least by its ends to the frame structure and stiffens the frame structure. Thus, the battery device exhibits high power and is robust.

12 Claims, 5 Drawing Sheets

(56) References Cited

U.S. PATENT DOCUMENTS

| | | |
|---|---|---|
| 2009/0246606 A1* | 10/2009 | Shimizu .......................... 429/62 |
| 2011/0162821 A1 | 7/2011 | Manzer |
| 2011/0200862 A1* | 8/2011 | Kurosawa ........... H01M 2/1016 429/120 |
| 2011/0212355 A1 | 9/2011 | Essinger et al. |
| 2012/0028099 A1* | 2/2012 | Aoki ............................. 429/120 |
| 2012/0129018 A1 | 5/2012 | Eckstein et al. |
| 2012/0141852 A1* | 6/2012 | Eberhard et al. ................ 429/98 |
| 2012/0301771 A1 | 11/2012 | Moser et al. |

FOREIGN PATENT DOCUMENTS

| | | |
|---|---|---|
| DE | 10 2009 030 017 | 12/2010 |
| JP | 2011116321 | 6/2011 |

OTHER PUBLICATIONS

Chinese Patent Appl. No. 201310424603X—Office Action issued on Aug. 17, 2015.

* cited by examiner

BATTERY DEVICE

CROSS REFERENCE TO RELATED APPLICATION

This application claims priority under 35 USC 119 to German Patent Appl. No. 10 2012 108 762.8 filed on Sep. 18, 2012, the entire disclosure of which is incorporated herein by reference.

BACKGROUND

1. Field of the Invention.

The invention relates to a battery device having at least two interconnected battery modules and having at least one cooling plate arranged between two battery modules. The present invention also relates to a motor vehicle having a battery device of said type.

2. Description of the Related Art.

U.S. 2011/0212355 A1 discloses a generic battery device having a plurality of interconnected battery modules and cooling plates arranged between the battery modules for the purpose of cooling the battery modules.

U.S. 2011/0162821 A1 discloses a cooling system for cooling solar cells.

U.S. Pat. No. 6,821,671 B2 discloses a battery device having a plurality of battery modules or battery cells. Cooling plates in the form of cooling fins are arranged between the individual battery cells, but are not traversed by flow. The cooling fins simultaneously stiffen the battery device, but are not in direct contact with the battery cells.

DE 10 2008 034 863 B4 discloses a lithium-ion battery having a multiplicity of individual cells that are interconnected in series or in parallel. A cooling plate is arranged at the pole side of the individual cells and is fastened to the battery housing at a plurality of fastening points so as to be at least partially horizontally movable. Thus, the cooling plate is decoupled from the battery housing at least to a certain extent and is movable independently thereof.

An object of the invention is to provide a generic type of battery device with a high level of inherent stiffness and a high power output.

SUMMARY OF THE INVENTION

The invention relates to a battery device that has interconnected battery modules oriented parallel to one another and cooling plates arranged between the battery modules. Each cooling plates is formed from two metal layers that are connected to one another. The cooling plates are traversed by a flow of fluid and have ends that are connected fixedly to a frame structure of a housing of the battery device for stiffening the frame structure. Thus, the battery device is encased by a housing that has the frame structure, and the individual cooling plates are connected to the frame structure, for example by screws, to stiffen the frame structure. The battery modules are arranged between the individual cooling plates and each battery module has multiple battery cells. The battery modules are in direct or at least heat-transmitting contact with the cooling plates. A direct connection of the individual battery modules to the frame structure may be provided, but is not imperative. The battery modules expand and contract due to temperature changes that arise during use of the battery device. Therefore the battery modules cannot be used for stiffening the frame structure and could be damaged if connected fixedly to the frame structure. However, each cooling plate is formed from at least two metal layers that are connected to one another, and hence the cooling plates are highly stiff, thereby increasing the stiffness of the frame structure and the battery device. Furthermore, fluid flows through the cooling plates to achieve effective cooling of the individual battery modules arranged between the cooling plates so that the battery modules can be operated at their maximum power for long periods.

The two metal layers of at least one cooling plate may be formed from steel or from aluminum. Steel is a relatively stiff material and, due to its high inherent stiffness, is particularly preferable for stiffening the battery device. Steel also is a good heat conductor and can impart a high cooling action to the battery modules to be cooled. Forming the two layers of at least one cooling plate from aluminum also stiffens the battery device. Aluminum also is considerably lighter than steel and contributes to an increased range of travel in motor vehicles operated purely by electric motor. Furthermore, aluminum has high thermal conductivity for achieving good heat transfer and good cooling of the battery modules.

The cooling plate preferably is longer than an associated battery module. Thus, an inlet and an outlet for the cooling plate may be arranged in a region protruding beyond the battery module when the cooling plate is installed in the battery device. The inlet and outlet both preferably are situated within the frame structure to ensure protection and to achieve optimum utilization of installation space. The battery device may have one central inlet and one central outlet on which the individual cooling plates are arranged in a branched manner.

A housing shell preferably surrounds the frame structure and may be formed from plastic or metal, such as steel or aluminum. The housing shell protects the individual battery modules from dirt, which is highly advantageous if the battery device is mounted on an underside of a motor vehicle and is exposed directly there to dirt from the road. A housing shell composed of plastic is lightweight, which is highly advantageous in the case of electric or hybrid vehicles, offers a certain level of protection against stone impact, and is resistant to corrosion, which is a considerable advantage for a battery device installed on the underside of the motor vehicle.

The invention also relates to a motor vehicle that has an electric motor and is equipped with the above-described battery device. The housing shell of the battery device preferably is matched to a shape of an underside of the motor vehicle. In this way, it is possible to attain a form-fitting arrangement, which is optimized with regard to installation space of the battery device underneath the motor vehicle. The housing shell preferably is formed from a hard plastic and can withstand the loads occurring at that location without problems. The battery modules are arranged within the housing shell so that the greatest possible number of battery modules is accommodated in a housing shell of the smallest possible volume.

Further important features and advantages of the invention will emerge from the drawings and from the associated description of the figures on the basis of the drawings.

The features specified above and the features explained below may be used in the respectively specified combination, in other combinations or individually without departing from the scope of the invention.

Preferred embodiments of the invention are illustrated in the drawings and will be explained in more detail in the following description, wherein the same reference numerals are used to denote identical or similar or functionally identical components.

DETAILED DESCRIPTION OF THE PREFERRED EMBODIMENTS

Figure 1:
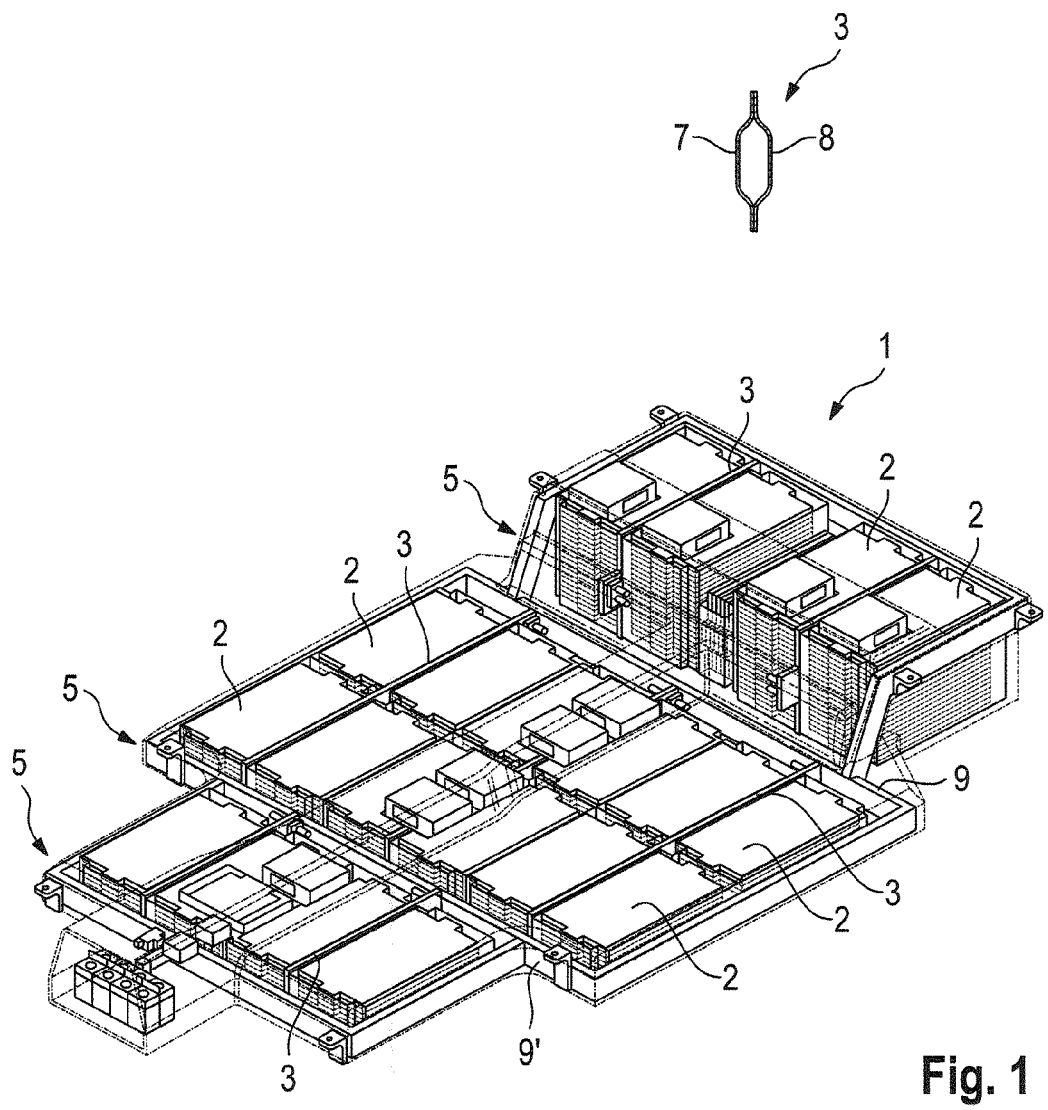
FIG. 1 is an exploded perspective view of a battery device according to the invention with a transparent housing shell.
Figure 2:
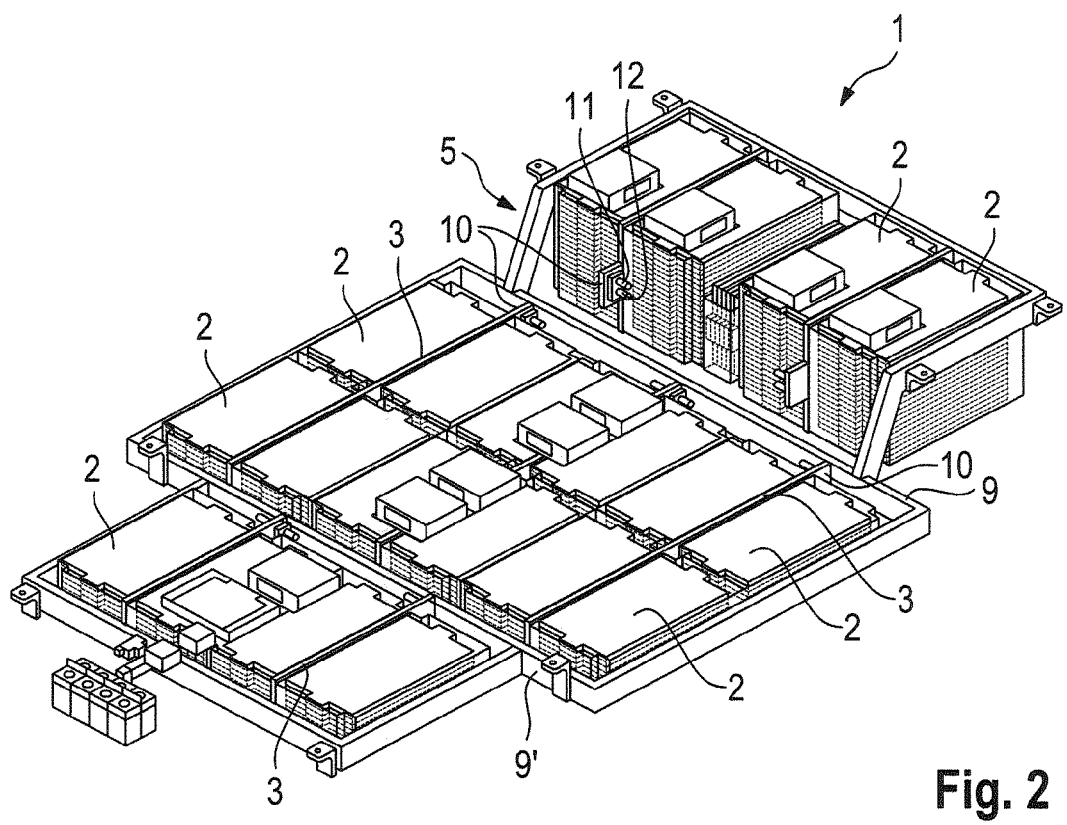
FIG. 2 is a perspective view similar to FIG. 1 but without the housing shell.
Figure 3:
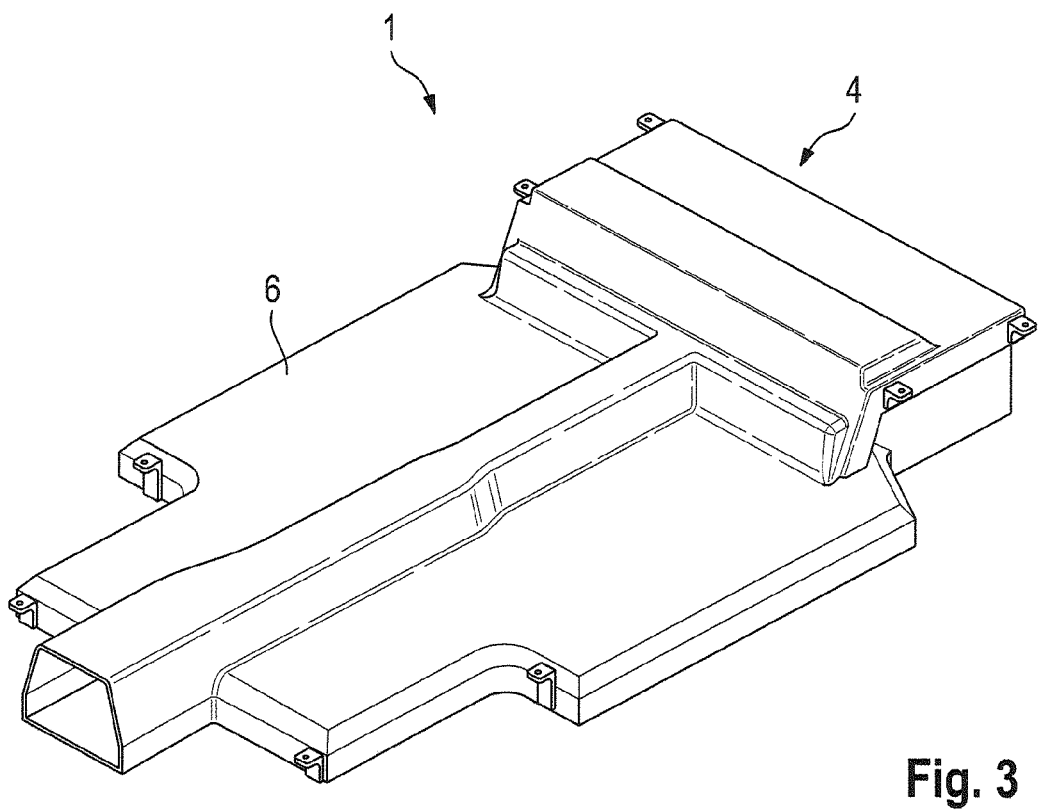
FIG. 3 is a perspective view of a possible housing shell of the battery device.

A battery device according to the invention is identified by the numeral 1 in FIGS. 1 and 2. The battery device 1 has multiple interconnected battery modules 2, each of which has a plurality of individual battery cells. A cooling plate 3 is arranged between at least two of said battery modules 2, and a fluid flows through the cooling plate 3 for cooling the battery modules 2. A housing 4 encases the battery device 1, as shown in FIG. 3, and is composed substantially of a frame structure 5 and a housing shell 6 that encases said frame structure 5. The cooling plate 3 is formed from two metal layers 7 and 8 that are connected to one another, as shown in FIG. 1. Furthermore, ends of the cooling plates 3 are connected fixedly to the frame structure 5 for stiffening the frame structure 5. As shown in FIG. 2, ends of the cooling plate 3 are connected to frame parts 9 or 9' of the frame structure 5 and thus stiffen the frame parts 9, 9' with respect to one another. The cooling plate 3 thus has a heat-dissipating or cooling effect and also stiffens the frame structure 5 and the entire battery device 1. The two metal layers 7, 8 of the cooling plate 3 are connected to one another in a fluid-tight manner. Additionally, the cooling plate 3 exhibits high flexural stiffness, and is particularly well suited to providing a stiffening action.

The frame structure 5 and/or the metal layers 7, 8 of the cooling plate 3 preferably are made of steel or aluminum. A connection between the cooling plates 3 and the respective frame part 9, 9', or more generally the frame structure 5, may be realized by screw connections or be welding.

As shown in FIGS. 1 and 2, the cooling plate 3 is considerably longer than the associated battery module 2, and even longer than two battery modules 2 arranged in a row. Thus, the cooling plate 3 has a region 10 that protrudes beyond the respective battery module 2. An inlet 11 and an outlet 12 for the respective cooling plate 3 are arranged in the protruding region 10. Additionally, the inlet 11 and also the outlet 12 are arranged within the frame structure 5 and thus in a protected manner.

As shown in FIG. 3, the entire battery device 1 is surrounded by a housing shell 6 that surrounds or encases the battery device 1. The housing shell 6 may be formed from plastic or from metal, such as steel or aluminum. An embodiment formed from a rust-resistant and simultaneously lightweight material, such as aluminum or plastic, is particularly advantageous for use in the automotive field.

Figure 4:
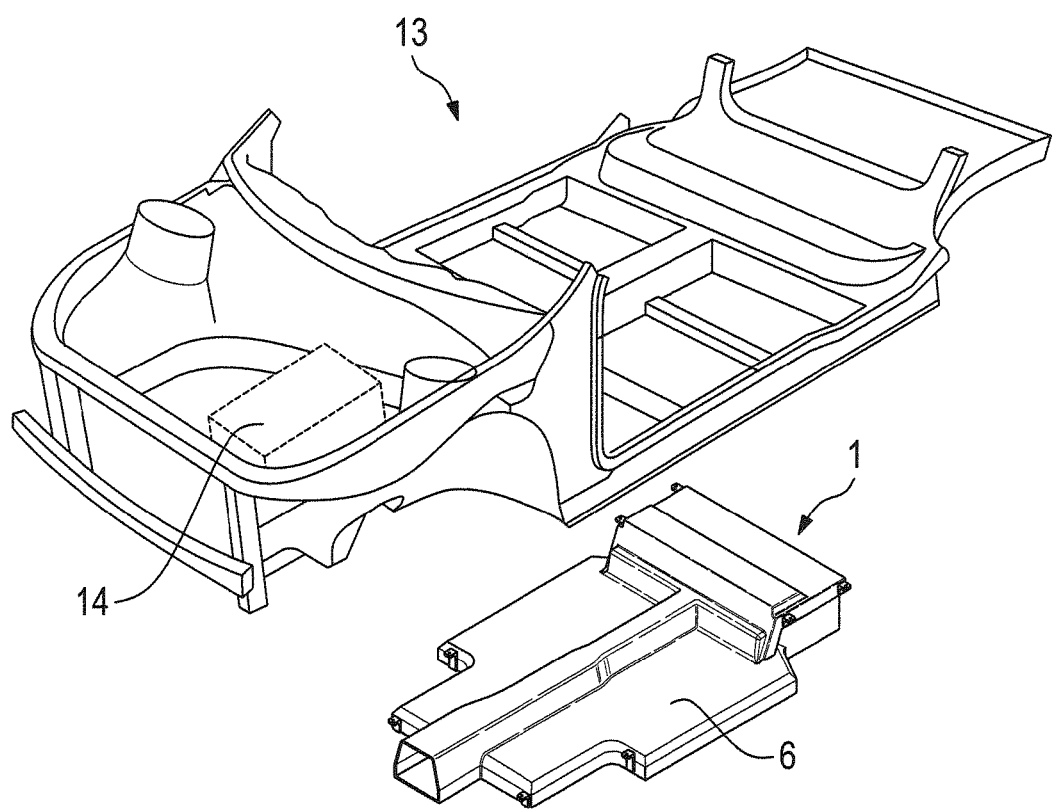
FIG. 4 is an exploded perspective view of a frame of a motor vehicle and the battery device from above.
Figure 5:
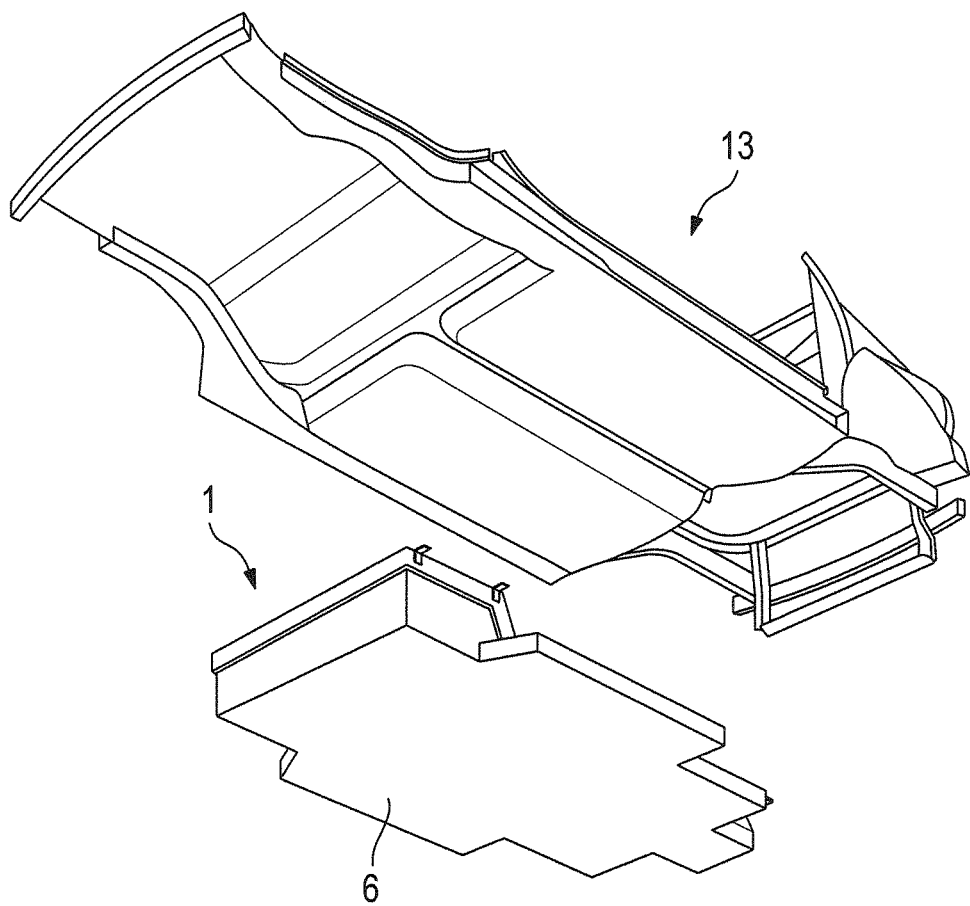
FIG. 5 is an exploded perspective view of the battery device and the motor vehicle from below.

FIGS. 4 and 5 show a bodyshell of a motor vehicle 13 with the battery device 1 arranged on the underside of the motor vehicle 13. The motor vehicle 13 may be for example in the form of an electric or hybrid vehicle, and accordingly has an electric motor 14 for providing drive. To permit a space-saving an arrangement of the battery device 1 on the motor vehicle 13, the housing shell 6 of the battery device 1 is adapted to a shape of an underside of the motor vehicle 13. The housing shell 6 also may be optimized with regard to aerodynamic aspects. As a result of the arrangement of the battery device 1 close to the road, an embodiment formed from plastic is for example recommended for the housing shell 6, because such an embodiment is both insensitive with respect to stone impact and also insusceptible to corrosion.

The battery device 1 of the invention enables an electric or hybrid vehicle to be equipped with a stiff and robust energy supply device which, due to the effective cooling, also exhibits particularly high power. Both the increased cooling action and also the improved stiffness are attained here as a result of the two-layer cooling plates 3.

What is claimed is:

1. A battery device comprising:
   a housing having a frame structure including at least first and second substantially parallel side walls spaced from one another;
   at least two interconnected battery modules disposed within the housing; and
   at least one cooling plate arranged between the at least two interconnected battery modules and extending in a longitudinal direction, the at least one cooling plate being formed from two metal layers that are connected to one another and form a fluid flow channel therebetween for accommodating a flow of cooling fluid for cooling the battery modules, and longitudinally opposite first and second ends of the two metal layers fixedly connected to the first and second side walls of the frame structure respectively for stiffening the housing.

2. The battery device of claim 1, wherein the two metal layers of the at least one cooling plate are formed from steel or aluminum.

3. The battery device of claim 1, wherein the at least one cooling plate is screwed to the frame structure.

4. The battery device of claim 1, wherein the at least one cooling plate has an inlet and an outlet in a region protruding beyond the battery module, the inlet and the outlet being situated within the frame structure.

5. The battery device of claim 1, further comprising a housing shell surrounding the frame structure.

6. The battery device of claim 5, wherein the housing shell is formed from plastic.

7. A motor vehicle comprising:
   an electric motor; and
   a battery device, the battery device including a housing having a frame structure with at least first and second spaced apart and substantially parallel side walls, at least two interconnected battery modules disposed within the housing, and at least one cooling plate arranged between the two interconnected battery modules and extending in a longitudinal direction, the at least one cooling plate being formed from two metal layers that are connected to one another and form a fluid flow channel therebetween for accommodating a flow of cooling fluid for cooling the battery modules, and longitudinally opposite first and second ends of the two metal layers are fixedly connected to the first and second side walls of the frame structure respectively for stiffening the housing.

8. The motor vehicle of claim 7, wherein the housing shell of the battery device is matched to a shape of an underside of the motor vehicle.

9. The motor vehicle of claim 8, wherein the motor vehicle is an electric or hybrid vehicle.

10. The motor vehicle of claim 8, wherein the underside of the motor vehicle is formed with a plurality of concave and convex surface areas, and wherein the housing of the battery device has an upper side with a plurality of convex and concave surface areas configured to nest respectively with the concave and convex surface areas on the underside of the motor vehicle.

11. The motor vehicle of claim 10, wherein the housing of the battery device has a lower side that is substantially planar.

12. The battery device of claim 5, wherein the housing shell is formed from steel or aluminum.

\* \* \* \* \*